Oct. 16, 1934.  A. SHAPIRO  1,977,293

CINEMATOGRAPH AND SYNCHRONIZED SOUND REPRODUCING UNIT

Filed July 15, 1931   6 Sheets-Sheet 1

Oct. 16, 1934.　　　A. SHAPIRO　　　1,977,293
CINEMATOGRAPH AND SYNCHRONIZED SOUND REPRODUCING UNIT
Filed July 15, 1931　　　6 Sheets-Sheet 2

Oct. 16, 1934. A. SHAPIRO 1,977,293
CINEMATOGRAPH AND SYNCHRONIZED SOUND REPRODUCING UNIT
Filed July 15, 1931 6 Sheets-Sheet 3
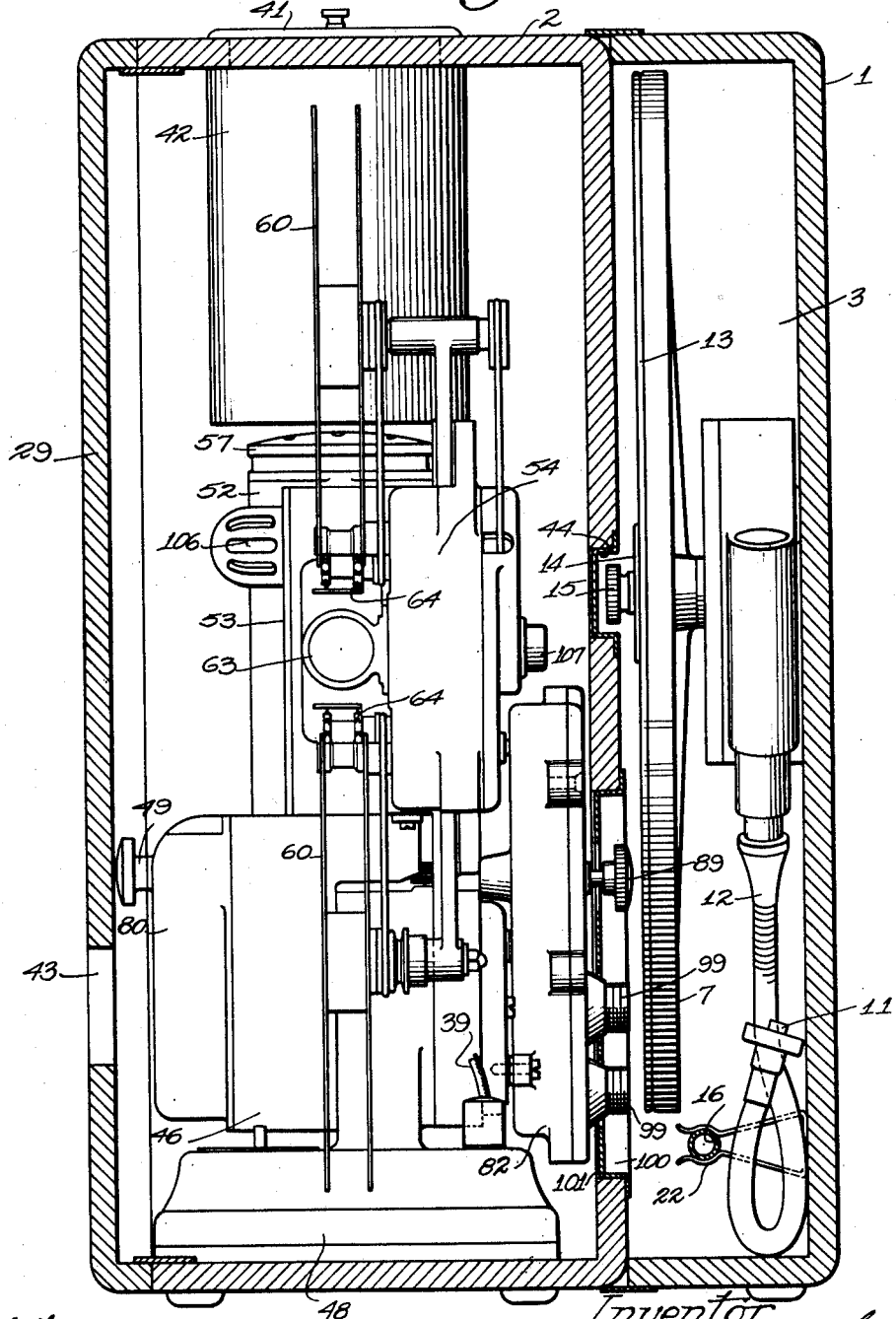

Oct. 16, 1934.  A. SHAPIRO  1,977,293
CINEMATOGRAPH AND SYNCHRONIZED SOUND REPRODUCING UNIT
Filed July 15, 1931  6 Sheets-Sheet 4

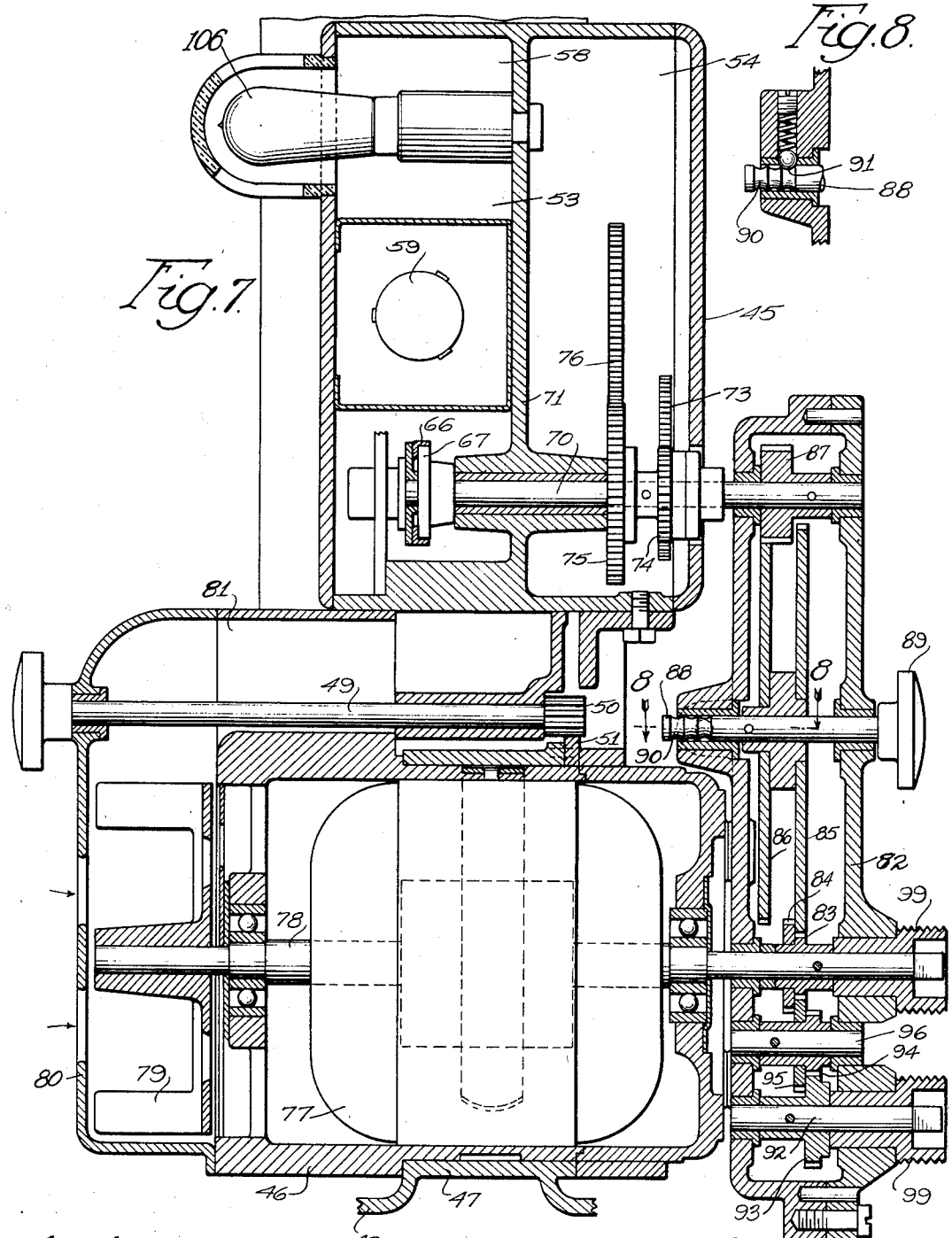

Oct. 16, 1934.    A. SHAPIRO    1,977,293
CINEMATOGRAPH AND SYNCHRONIZED SOUND REPRODUCING UNIT
Filed July 15, 1931    6 Sheets-Sheet 6
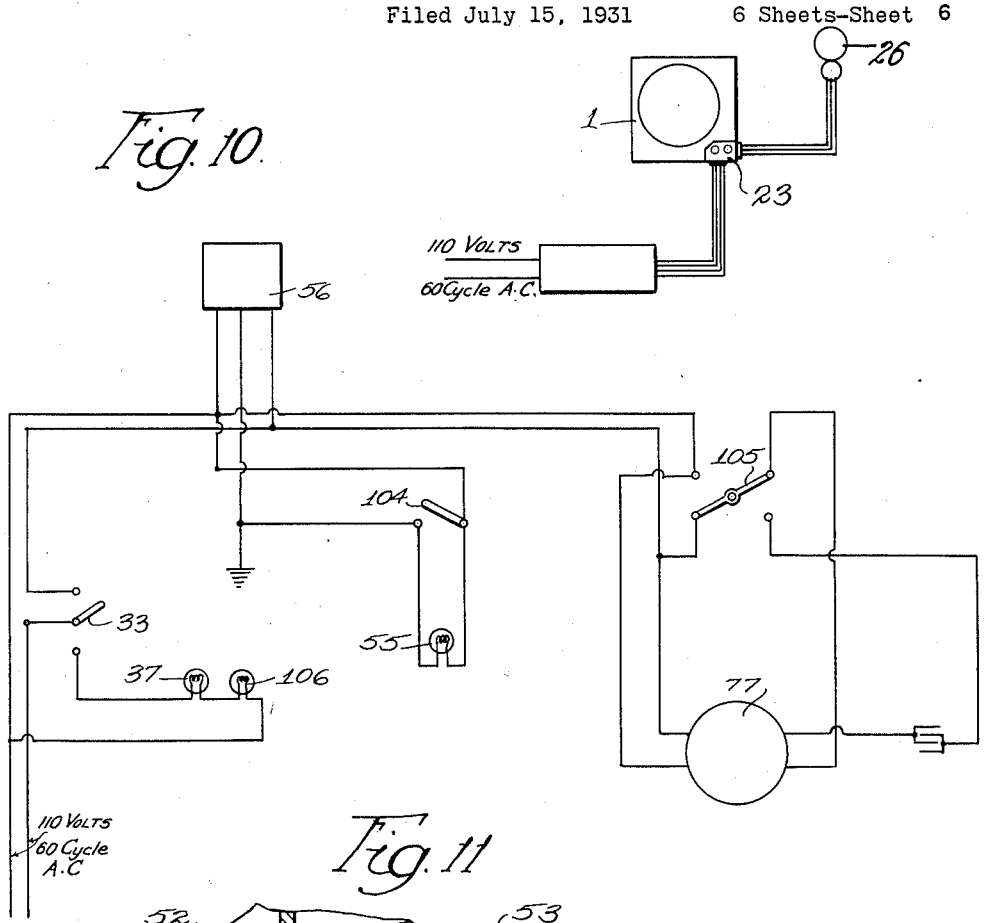
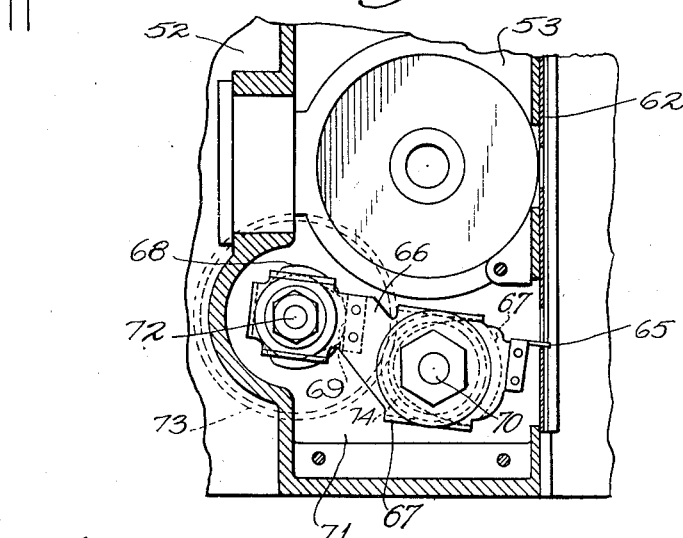

Patented Oct. 16, 1934

1,977,293

UNITED STATES PATENT OFFICE 1,977,293

CINEMATOGRAPH AND SYNCHRONIZED SOUND REPRODUCING UNIT

Abraham Shapiro, Chicago, Ill., assignor to Universal Stamping & Mfg. Co., Chicago, Ill., a corporation of Illinois Application July 15, 1931, Serial No. 550,841

4 Claims. (Cl. 88—16.2)

This invention relates to moving picture apparatus in which a projector is connected with a sound reproducing unit for showing motion pictures with a synchronized sound accompaniment.

In sound reproduction, two types of records have long been in use. In one system, the sound waves are photographed on a sensitized film from which film record they are reproduced by the action of a beam of light. With this photographic system, we are not concerned in this application. In the other system known as the disc system, with which we are here concerned, the sound waves are recorded by a cutting stylus on a disc and reproduced by contact with a needle.

The usual discs used for phonographs are intended to be operated at a speed of approximately 80 R. P. M. In order to obviate the necessity of using an exceptionally large disc, the disc records, which are used in connection with motion picture films, are intended for operation at a speed of approximately 33⅓ R. P. M.

Silent cinematograph films are intended for operation at a speed of approximately sixteen frames per second. Cinematograph films, on which the sound record is produced photographically, must be of greater length than silent films and therefore must be operated at a higher speed. Such films are usually operated at a speed of twenty-four frames per second.

In motion picture work, when the sound is recorded directly onto the disc while the picture is being filmed, there is no necessity for operating the film at a speed of twenty-four frames per second. In such work, in order to economize film, the film is operated at sixteen frames per second while the disc is driven at a speed of 33⅓ R. P. M.

However, very frequently the sound is first recorded photographically while the film is necessarily operating at twenty-four frames per second, and the sound is thereafter transferred to a disc. When such a disc record is later used in connection with the film or with a duplicate film, the film must be operated at twenty-four frames per second in order to be synchronized with the sound record.

For these reasons, in a combination cinematograph and sound unit, it is desirable to have sufficient flexibility to permit the disc record to be driven at either 33⅓ or 80 R. P. M. and the film to be operated at either sixteen or twenty-four frames per second. Such flexibility has not been possible with the motion picture equipment heretofore in use.

The main objects of this invention are to provide a cinematograph having a constant speed motor and improved selectively controlled mechanism actuated thereby for feeding the film either sixteen or twenty-four frames per second; to provide an improved sound reproducing unit having a turntable for supporting the disc record; to provide improved mechanism driven by said motor for rotating said turntable at either 33⅓ or 80 R. P. M.; to provide an improved form of casing having separable parts for housing the cinematograph and turntable; to provide improved means for supporting the tone arm of the sound unit so as to permit the tone arm to be collapsed when the two parts of the casing are assembled for carrying purposes; to provide an improved arrangement of the electric circuits for controlling the motor and pilot lights; and to provide a cinematograph and synchronized sound unit of this kind which is compact and portable.

An illustrative embodiment of this invention is shown in the accompanying drawings, wherein:—

Fig. 4 is a transverse vertical section, taken on the line 4—4 of Fig. 3 and showing the two units in assembled relation for carrying purposes.

Fig. 5 is a top plan of the sound unit, showing also a portion of the connected cinematograph unit; the collapsed position of the tone arm being shown in dotted outline.

Fig. 6 is an enlarged section, taken on the line 6—6 of Fig. 5.

Fig. 7 is an enlarged vertical section taken on the line 7—7 of Fig. 3.

Fig. 8 is a sectional detail, taken on the line 8—8 of Fig. 7.

Fig. 9 is a sectional detail showing the means of connecting the flexible shaft of the turntable with the drive shafts.

Fig. 10 is a diagrammatic view showing the electric circuits.

Fig. 11 is a fragmentary vertical section of the shutter compartment showing the film feeding means.

Figure 1:
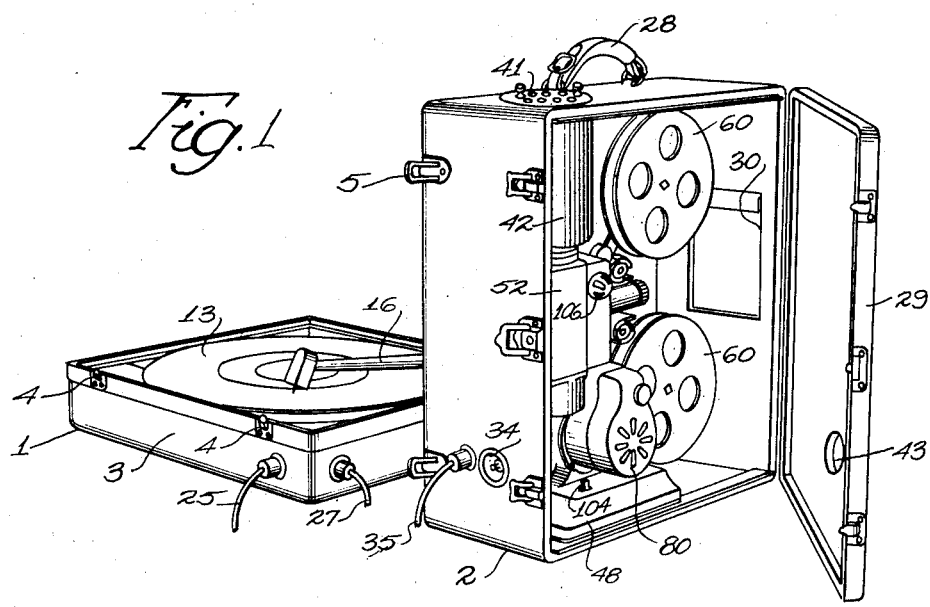
Figure 1 is a perspective view of a sound unit and cinematograph unit to which this invention is applied; the hinged door of the cinematograph unit being open for the purpose of threading the film.

In the form shown, the improved apparatus is housed in a casing comprising a tray 1 for the sound unit and a box 2 for the cinematograph.

The tray 1 has a rim 3 provided with keepers 4 adapted to engage latches 5 on the box 2 when the parts are assembled as a unit for carrying purposes as shown in Fig. 4. The tray may be provided with receptacles 6 for the usual phonograph needles.

In the form illustrated, the improved sound unit comprises a turntable 7 located within the tray 1 and mounted on a spindle 8 having a gear 9, which is driven by a worm 10 on a flexible shaft 11. The shaft 11 has the usual flexible casing 12. The turntable 7 is adapted to support a record disc 13 which is secured thereto by a washer 14 and nut 15. Also mounted in the tray 1, is a tone arm 16 for supporting a stylus 17 adapted to coact with the record disc 13.

The inner end of the tone arm 16, is provided with a plate 18 which is slidably supported on a plurality of posts 19 so as to permit the tone arm to be collapsed, as shown in dotted outline in Fig. 6, when the casing parts are assembled as shown in Fig. 4. Secured to the upper ends of the posts 19, are screws 20, which engage key hole slots 21 in the plate 18 for securing the tone arm in its operative position. A clip 22 is provided for supporting the outer end of the tone arm when the tone arm is collapsed as shown in dotted outline in Fig. 6.

Mounted in one corner of the tray, is a potentiometer 23 having the usual control knobs 24. The potentiometer is electrically connected with the amplifier unit, not shown, by means of a conductor 25. A microphone 26 may be connected to the potentiometer by a conductor 27 where it is desirable to use a microphone in connection with the apparatus.

The box part 2 of the casing has a handle 28 secured to its top wall whereby the entire apparatus may be conveniently carried in one hand when the casing parts are assembled. One side wall 29 of the box is hinged as illustrated in Fig. 1 so as to permit access to the cinematograph. Formed in the front wall of the box part 2, is an opening 30 through which the light rays are projected. This opening 30 has a hinged shutter which is adapted to form a screen when closed so as to permit the operator to project the starting signals onto the shutter when he is preparing to start the sound unit. With this improved construction, the starting signals are not visible to the audience.

Mounted on the rear wall of the casing box 2, is a switch box 32 having a switch element 33 projecting rearwardly through an opening 34. The switch box is connected to the working current by a conductor 35, and is connected with the cinematograph by a conductor 36. Mounted on the side wall of the box 2 adjacent the sound unit, is a pilot light 37 adapted to illuminate the sound unit while the record disc is being changed. The pilot light 37 is connected with the switch box by a conductor 38 and is connected with the pilot light of the cinematograph by a conductor 39.

Formed in the upper wall of the box 2, is an air passage 40, in which is seated a perforated plate 41, from which is suspended a chimney 42. Another air passage 43 is formed in the hinged door 8 of the box.

Formed in the side wall of the box 2, adjacent the sound unit, is a centrally located recess 44 which is adapted to receive the nut 15 when the casing parts are closed, as shown in Fig. 4.

The cinematograph herein shown, is preferably of the type illustrated in Design Patent No. 84,497 and in Patent No. 1,816,234. The cinematograph includes a casing 45 having a cylindrical part 46, which is journaled in an annular bearing 47 formed on a base 48. Journaled on the casing 45, is a shaft 49 having a pinion 50 meshing with a rack 51 on the base for manually tilting the projector casing to adjust the light field on the screen, as more fully described in said Patent No. 1,816,234.

The upper part of the projector casing includes a lamp compartment 52, shutter compartment 53, and a lateral gear compartment 54. Mounted in the lamp compartment 52, is the usual projector lamp 55. In order to permit the use of a twenty volt lamp, the projector lamp circuit includes a transformer 56 which is mounted within the box 2. The lamp compartment 52 has a perforated cap 57, which is located directly below the chimney 42. The rear compartment 52 and front compartment 53 are separated by a partition 58 in which is supported the usual light condenser lenses 59.

Mounted on the front part of the projector casing, is a pair of reels 60 for supporting a film 61 which is adapted to be fed through the usual film guideway 62 behind a lens mounting 63, by sprockets 64 and a feeding claw 65. The film feeding claw projects through the film guideway for engagement with the usual film perforations.

The film feeding mechanism is more fully shown and described in application Serial No. 372,867, filed June 22, 1929 and issued as Patent No. 1,855,773.

In the form herein shown, the claw 65 is mounted on the forward end of an arm 66 which is reciprocated vertically by means of a cam 67 and reciprocated horizontally by a pair of cams 68 and 69. The cam 67 is mounted on a shaft 70 which is journaled in a wall 71 located between the compartments 53 and 54. The cams 68 and 69 are supported on a shaft 72 which is also journaled on the wall 71. The shaft 72 has a gear 73 which is driven by a pinion 74 on the shaft 70. Fixed on the shaft 70 is a gear 75 which drives a gear 76 connected to the light shutter, not shown, more fully described in application Serial No. 441,019, filed April 2, 1930 and issued as Patent No. 1,830,567.

The shaft 70 projects through the projector casing and is adapted to be driven at either one of two speeds by an electric motor 77 to which the shaft 70 is geared.

The motor 77 is housed within the cylindrical part 46 of the casing 45, as more fully described in said Patent No. 1,816,234. The motor is preferably a constant speed, 110 V. 60 cycle, alternating current motor. The motor has an armature shaft 78, on one end of which is a fan 79 located in a fan housing 80 for causing a flow of air through an air passage 81 communicating with the lamp compartment 52. The other end of the motor shaft 78 projects through a gear housing 82 which is secured to the projector casing.

Fixed on the motor shaft 78, is a small pinion 83 and a larger pinion 84 adapted to mesh, respectively with gears 85, and 86 for driving a pinion 87 which is fixed on the film feeding shaft 70.

The gears 85 and 86 are fixed on a spindle 88 which is axially shiftable in the gear housing for moving the gears 85 and 86 into and out of mesh with the pinions on the motor shaft. The outer end of the spindle 88 has a knob 89 and its inner end has annular grooves 90 adapted to receive a spring pressed ball 91 for releasably securing the spindle in any one of its adjusted positions.

The gears are arranged so that the gear 86 is constantly in mesh with the pinion 87. When the spindle 88 is in its innermost position, as shown in Fig. 7, the film feeding shaft is driven through the gears 83, 85, 86 and 87, and the film is fed sixteen frames per second. The gears 85 and 86 are spaced apart, as shown in Fig. 7, so that, in the intermediate position of the spindle 88, the gears 83 and 84 are both out of mesh and the film feeding mechanism is idle. When the spindle is in its outermost position, the film feeding mechanism is driven through the pinion 84, gear 86 and pinion 87, and the film is fed twenty-four frames per second.

Journaled in the lower part of the gear housing, is a shaft 92 having a pinion 93 which is driven by the armature shaft 78 through reduction gears 94 and 95 mounted on an intermediate shaft 96. The armature shaft 78 rotates at approximately 2.4 times the speed of the shaft 92.

The outer ends of the shafts 78 and 92 are polygonal in cross section for engagement with a socket 97 in the outer end of the flexible shaft 11. The flexible shaft 11 is adapted to be detachably connected to either one of the shafts 78 and 92 by threaded coupling members 98 and 99, for driving the turntable at either 80 R. P. M. or 33⅓ R. P. M.

The knob 89 and the coupling members 99 project through a plate 100 which is mounted in an opening 101 formed in the side wall of the box 2.

Mounted on the base of the projector, is a plug 102 electrically connected to the projector lamp, and having a conductor 103 leading to the transformer 56. Also mounted on the base of the projector, is a switch 104 for controlling the projector lamp, and a reversing switch 105 for controlling the motor. The motor is electrically connected with the conductor 36.

Mounted on the upper part of the projector casing, is a pilot light 106 which is connected with the pilot light 37 by the conductor 39.

By means of the switch 33, when the motor is started, the pilot lights are simultaneously turned off and, when the motor is stopped, the pilot lights are simultaneously turned on.

The film rewinding mechanism is fully shown and described in application Serial No. 438,497, filed March 24, 1930. This mechanism includes a knob 107, which is located in alinement with an opening 108 formed in the adjacent wall of the box 2.

The separate electrical circuits employed in this improved apparatus are clearly illustrated in Figure 10.

Figure 2:
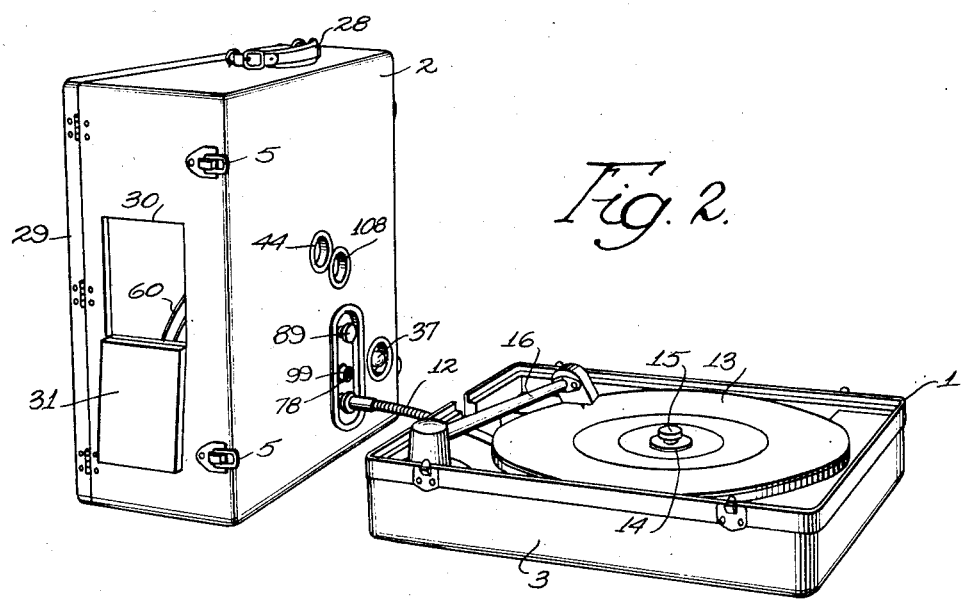
Fig. 2 is another perspective view showing the two units in position for operation.
Figure 3:
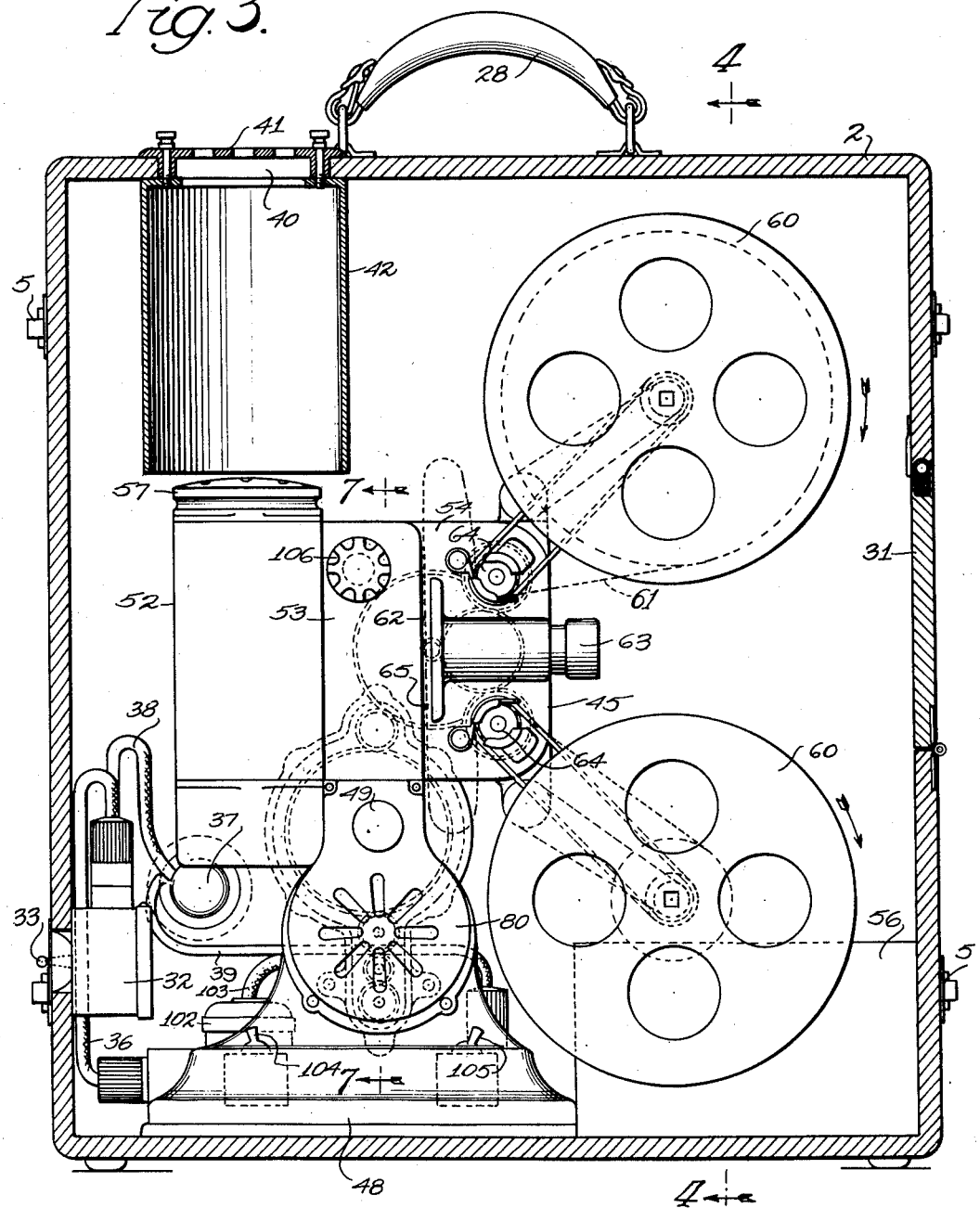
Fig. 3 is a vertical longitudinal section of the cinematograph unit; the projector being shown in elevation and certain portions in dotted outline.

To operate this improved mechanism, the sound unit is separated from the box 2 and is placed in a horizontal position alongside the cinematograph unit, as shown in Fig. 2. If it is desired to show a silent film with no musical accompaniment, the sound unit is disconnected and the knob 89 is pushed to its innermost position so that the film will be fed sixteen frames per second, which is the proper speed for silent films.

If it is desired to use an ordinary phonograph record for producing a musical accompaniment for a silent film, the flexible shaft 11 is connected to the armature shaft 78 for driving the turntable approximately 80 R. P. M. The knob 89 should then be pushed to its innermost position so that the film will be fed sixteen frames per second.

When it is desired to use the sound unit without the motion pictures, as for instance when the operator entertains his audience while he is rethreading the film, the knob 89 is pulled outwardly to its intermediate position for disconnecting the film feeding mechanism from the motor. If an ordinary phonograph record is used in this case, the flexible shaft 11 is connected to the motor shaft 78, for driving the turntable 80 R. P. M. If a motion picture sound disc is used, the flexible shaft 11 is connected to the lower shaft 92 for driving the turntable 33⅓ R. P. M.

When a sound film is used in connection with a record disc to which the sound has been transferred from a photographic record, the film should be fed twenty-four frames per second while the turntable is driven 33⅓ R. P. M. In this case, the knob 89 is pulled to its outermost position for shifting the gear 86 into mesh with the pinion 84, and the flexible shaft 11 is connected to the shaft 92.

When a sound film is used in connection with a record disc, and the original recording was by disc, the film is fed sixteen frames per second while the turntable is driven 33⅓ R. P. M. In this case, the knob 89 is pushed to its innermost position for shifting the gear 85 into mesh with the pinion 83 and the flexible shaft 11 is connected to the lower shaft 92.

Upon the stopping of the motor by the operation of the switch 33, the pilot lights are simultaneously turned on for illuminating the interior of the box 2 and the sound unit turntable. This is a great advantage because it obviates the necessity of lighting the room lights when the operator desires to rewind the film and change the sound record.

To rewind the film, the switch 105 is reversed for reversing the motor. The switch 104 enables the operator to economize the projector lamp when the film is being rewound and also when the sound unit is being used without the film.

In certain prior devices, the sound unit has been driven through the film feeding mechanism of the cinematograph. Such devices are objectionable because of the excessive strain to which the film feeding mechanism is subjected. In the improved construction herein claimed, the sound unit is directly connected to the motor, independently of the film feeding mechanism.

Although but one specific embodiment of this invention has been herein shown and described, it will be understood that details of the construction shown may be altered without departing from the spirit of this invention as defined by the following claims:

I claim:

1. A device of the class described comprising a portable housing having two separable sections detachably secured together, a cinematograph in one section of said housing, the front wall of said one section having an opening through which light rays are projected, one of the side walls of said one section being hinged to said one section to permit access to said cinematograph, and a turntable mounted on the other of said sections and adapted to be operatively connected to said cinematograph, said turntable being concealed by said other section and by the opposite wall of said one section when said sections are secured together.

2. In a device of the class described, a sound unit having a turntable, a cinematograph unit comprising a constant speed motor, a drive shaft on said motor, another shaft, reduction gearing connecting said other shaft with said drive shaft, and a flexible shaft having one end connected to said turntable, the other end of said flexible shaft being adapted to be directly coupled to said drive shaft or to said other shaft.

3. In a device of the class described, a sound unit having a turntable, a cinematograph unit comprising a constant speed motor, a drive shaft, film feeding means, gearing connecting said drive shaft with said film feeding means, a gear changer for changing the ratio of said gearing, another shaft driven by said drive shaft at a respectively different speed, and a flexible shaft having one end connected to said turntable, the other end of said flexible shaft having a coupling adapted to be directly coupled to said drive shaft or to said other shaft.

4. In a device of the class described, a sound unit having a turntable, a cinematograph unit comprising a constant speed motor having a drive shaft, film feeding means, changeable gearing connecting said drive shaft with said film feeding means for moving the film either sixteen or twenty-four frames per second, another shaft, reduction gearing connecting said other shaft with said drive shaft, and a flexible shaft having one end connected to said turntable, the other end of said flexible shaft being adapted to be directly coupled to said drive shaft for driving said turntable 80 R. P. M. and being adapted to be directly coupled to said other shaft for driving said turntable 33⅓ R. P. M.

ABRAHAM SHAPIRO.